United States Patent

Palan et al.

[11] Patent Number: 5,926,080
[45] Date of Patent: Jul. 20, 1999

[54] LEVEL GAGE WAVEGUIDE TRANSITIONS AND TUNING METHOD AND APPARATUS

[75] Inventors: Donald F. Palan, Chaska; Mark J. Gailloux, Eden Prairie, both of Minn.

[73] Assignee: Rosemount, Inc., Eden Prairie, Minn.

[21] Appl. No.: 08/939,199

[22] Filed: Sep. 29, 1997

Related U.S. Application Data

[63] Continuation-in-part of application No. 08/729,681, Oct. 4, 1996, abandoned.

[51] Int. Cl.⁶ ............... H01P 1/08; G01F 23/00; G01R 27/00
[52] U.S. Cl. .................... 333/252; 333/254; 333/34; 73/290 R; 324/642; 324/644
[58] Field of Search ............... 333/33, 34, 248, 333/250, 252, 254; 324/637, 642, 644; 73/290 V, 290 R

[56] References Cited

U.S. PATENT DOCUMENTS

| | | |
|---|---|---|
| 2,786,185 | 3/1957 | Sege et al. ................ 333/252 |
| 3,001,160 | 9/1961 | Trousdale ................ 333/98 |
| 4,032,868 | 6/1977 | Trudeau ................ 333/248 X |
| 4,210,915 | 7/1980 | Kienberger et al. ........... 343/786 |
| 4,688,009 | 8/1987 | Ferguson et al. ........... 333/252 |
| 5,070,730 | 12/1991 | Edvardsson ................ 73/290 V |
| 5,279,156 | 1/1994 | van der Pol ................ 73/290 |
| 5,305,237 | 4/1994 | Dalrymple et al. ........... 364/562 |
| 5,495,218 | 2/1996 | Erb et al. ................ 333/248 |

FOREIGN PATENT DOCUMENTS

| | | | |
|---|---|---|---|
| 32 14 487 A1 | 10/1987 | Germany ................ 333/252 |
| 699494 | 9/1952 | United Kingdom . |
| 2 187 336 | 9/1987 | United Kingdom . |
| WO 92/13257 | 8/1992 | WIPO . |
| WO 97/12211 | 4/1997 | WIPO . |

*Primary Examiner*—Robert Pascal
*Assistant Examiner*—Barbara Summons
*Attorney, Agent, or Firm*—Westman, Champlin & Kelly

[57] ABSTRACT

A waveguide for microwave radar level gages that includes a process sealed barrier in the waveguide that is impedance matched with bore transition sections of the waveguide at opposite ends thereof. The impedance matching results in positioning of the tapered end of the barrier offset from the ends of the bore transition sections.

10 Claims, 4 Drawing Sheets

LEVEL GAGE WAVEGUIDE TRANSITIONS AND TUNING METHOD AND APPARATUS

CROSS REFERENCE TO RELATED APPLICATION

This application is a continuation-in-part of our application Ser. No. 08/729,681, filed Oct. 4, 1996, now abandoned. Reference is also made to copending application Ser. No. 08/926,294, filed Sep. 5, 1997 for Microwave Waveguide for Tank Level Sensors U.S. Pat. No. 5,877,663.

BACKGROUND OF THE INVENTION

The present invention relates to forming microwave waveguides for use in level gages to reduce microwave reflection by appropriate waveguide shape transitions, and transitions to barrier materials, together with impedance matching techniques. The techniques are particularly useful in the development of level gages capable of measuring low dielectric constant process fluids and operating at the high frequencies available with present day microwave electronics.

The tuning of microwave components and creation of low reflective waveguide transitions has been attempted for many years by highly skilled engineers and technicians. The techniques that have been used are known by those who work in the field and include pretuned, air filled, off the shelf components that are readily available, as well as transition fittings to perform a number of signal transmission tasks. Some of these components have been integrated into microwave level gages and involve the use of many components to achieve a reasonable amount of tuning. Problems have occurred where there is a transition from a standard rectangular waveguide cross section to a circular cross section, which is desired in cases for non-intrinsically safe sensors that require a mechanical barrier to isolate the sensor, electronics housing, and conduit system from process fluids and vapors. Also the transition from an air filled waveguide to a waveguide filled with barrier materials can degrade performance. Market demands are for higher level measurement accuracy (for example, plus or minus 1 mm) from a physically smaller gage. In order to achieve this performance and the required signal to noise ratio, the tuning and geometry of the waveguide is critical.

Signal reflection in a microwave waveguide that contains a process seal meeting explosion proof/flame proof safety approval requirements has been a source of inefficiencies, losses and false target returns. The present invention reduces losses and inefficiencies to improve microwave level gage accuracy.

SUMMARY OF THE INVENTION

The present invention relates to a waveguide assembly for a level gage that carries microwave signals between a generator and an antenna, acts as a process seal, and meets the explosion proof/flame proof safety approval requirements with the sections of the waveguide being impedance matched.

The present invention utilizes a predominantly circular cross section waveguide within an adapter for connecting a level gage electronics housing to a standard tank flange. The circular cross section provides ease of manufacturing, tolerance control and concentricity of waveguide sections. The circular cross section waveguide is formed with a transition portion leading from a rectangular cross section (which mates to a standard coaxial cable to rectangular waveguide adapter) to the circular cross section waveguide. An opposite end of the circular cross section waveguide terminates in an expanding size conical transition section leading to a larger cylindrical bore open to an antenna aperture. Waveguides where the main portion is of a larger cross sectional area than the mating adapter or antennae also are used.

The main portion of the waveguide of the present invention is filled with a mechanical barrier that is secured in place to form a process seal to insure that the process vapor, which is generally high temperature and highly corrosive, does not damage the electronics in the housing, which are used for providing the microwave energy. The mechanical barrier in the waveguide is selected to be of a material that has a low dielectric constant over both the operating temperature and frequency ranges of the level gage, to aid in impedance matching. The material should be easy to machine or process, and have good temperature and pressure performance and should be compatible with repeatable, easy to control joining processes between the barrier and the flange adapter material through which the waveguide extends. The adapter or housing in which the waveguide is formed is generally manufactured of a stainless steel material. Common materials used for the barrier include Teflon, (polytetraflouroethylene), various thermoplastics, quartz, and selected types of ceramic materials.

The cross sectional size of the waveguide can be calculated when the operating frequency range of the gage is known, along with the dielectric constant of the waveguide barrier material (typically air in standard waveguides). The minimum and maximum waveguide diameters can be calculated so that only the desired operating frequency and transmission mode for the gage are possible.

Microwave electronics now available are capable of operating at up to 24 GHz, which is more than twice as high as the operating frequency of most standard microwave gages presently used. The higher frequency transmission enables reduction in the cross sectional area of the waveguide required for microwave propagation, whether circular or rectangular. Waveguides are primarily comprised of bores found throughout the length of the level gage from the electronics housing to the antenna, and higher frequencies permit a reduction in bore size. Mechanical barriers become better able to withstand the process pressure loads because of this smaller size. However, in the use of mechanical barriers, there is always a transition between a waveguide that is filled with air and the mechanical barrier, and in order to minimize reflected microwave energy at both the input end of the mechanical barrier (adjacent the coaxial cable to waveguide adapter) and the output end of the mechanical barrier (the end adjacent the antenna), it has been found that using tapered ends on the mechanical barrier aids in impedance matching.

The present invention positions the end of the tapered section of a barrier at a selected location in relation to the end of the bore transition section to substantially reduce the effect of reflected microwave energy and provide for "tuning" the waveguide system for impedance matching to achieve the accuracies needed.

The present invention also relates to an apparatus where in order to achieve the desired impedance matching the pointed end of the barrier transition section is not aligned with the plane formed at the end of the tapered bore transition section. The invention also relates to a method for determining the correct position of the mechanical barrier relative to the end of the tapered bore transition section for the impedance match tuning.

The barrier provides a process seal and good impedance matching between bore and barrier transition.

DETAILED DESCRIPTION OF THE PREFERRED EMBODIMENTS

Figure 1:
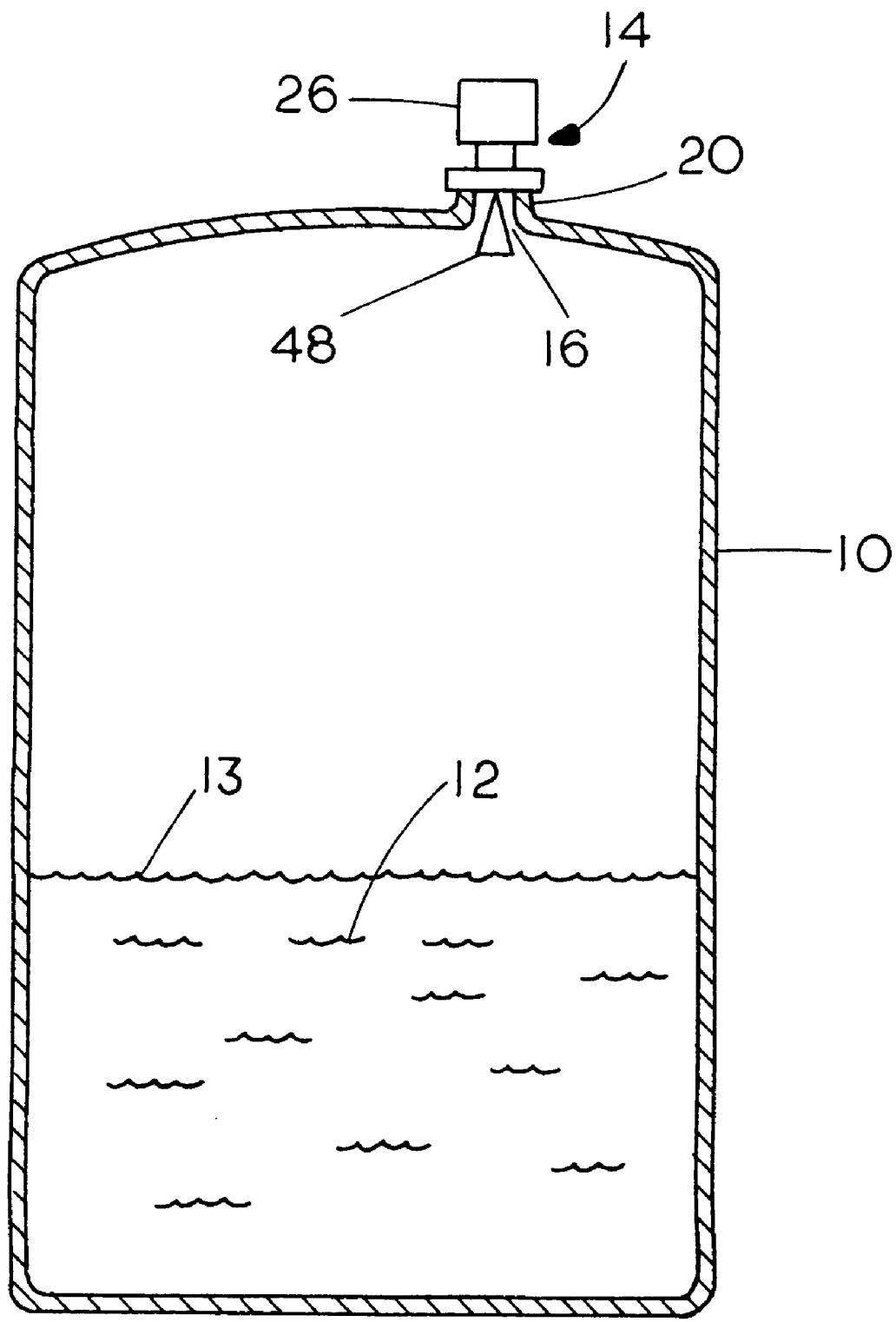
FIG. 1 is a schematic representation of a tank in which a microwave level indicator having a waveguide made according to the present invention is installed.

Referring to FIG. 1, a process tank indicated generally at 10 is filled with a liquid 12, the height or level of which is to be determined utilizing a microwave level sensor assembly 14. The level sensor assembly 14 is mounted on a tank port 16 at the top of the tank, and is sealed relative thereto. The microwave level sensor assembly transmits microwave energy through the tank port 16, along a waveguide and will receive reflected energy from the process material surface 13 to provide an indication of the level of the liquid material within the tank. The electronics that are used for transmitting the microwave energy, and receiving the reflections are well known, and are shown only schematically. The present invention works well with low dielectric liquids, such as petroleum products in addition to high dielectric liquids.

Figure 2:
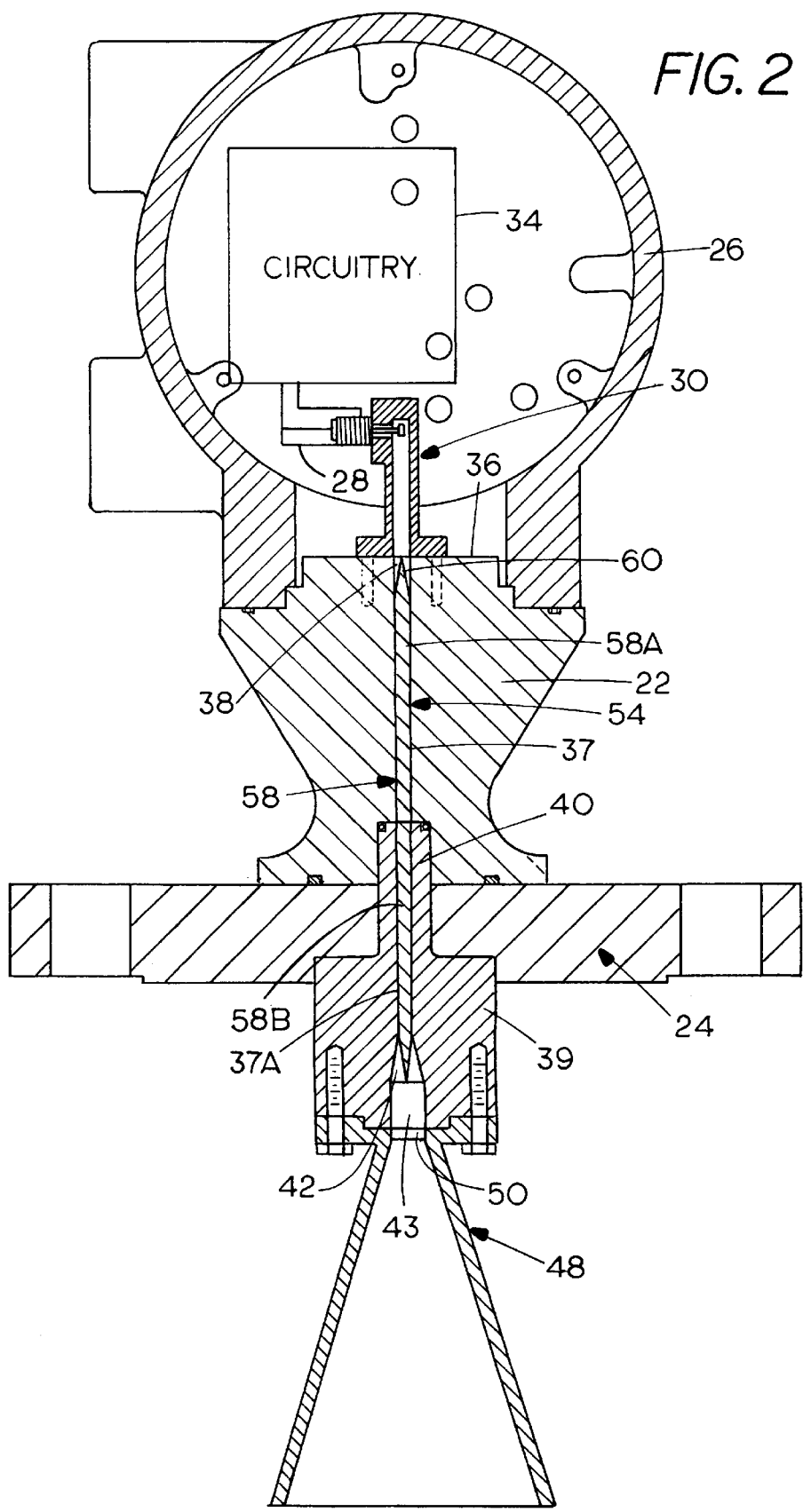
FIG. 2 is an enlarged cross sectional view of a microwave source and an antenna that are coupled through a thermal barrier flange adapter, and showing a waveguide made according to the present invention.

Referring to FIGS. 1 and 2, the microwave level sensor assembly 14 is illustrated. A level sensor assembly mounting flange or support 24 is secured with bolts to a tank flange surrounding port 16 at the top of a standoff 20. The mounting flange 24 is sealed with a suitable gasket. The mounting flange 24 is used for supporting both a housing to flange adapter 22 and the electronics housing 26, which includes microwave source circuitry of conventional design shown at 34. The microwave source circuitry 34 provides microwave energy through a coaxial connection indicated generally at 28 that is coupled to a coaxial to rectangular waveguide adapter 30 within the electronics housing 26. The coaxial to rectangular waveguide adapter 30 is secured with screws to a raised boss 36 of the housing to flange adapter 22.

Figure 4:
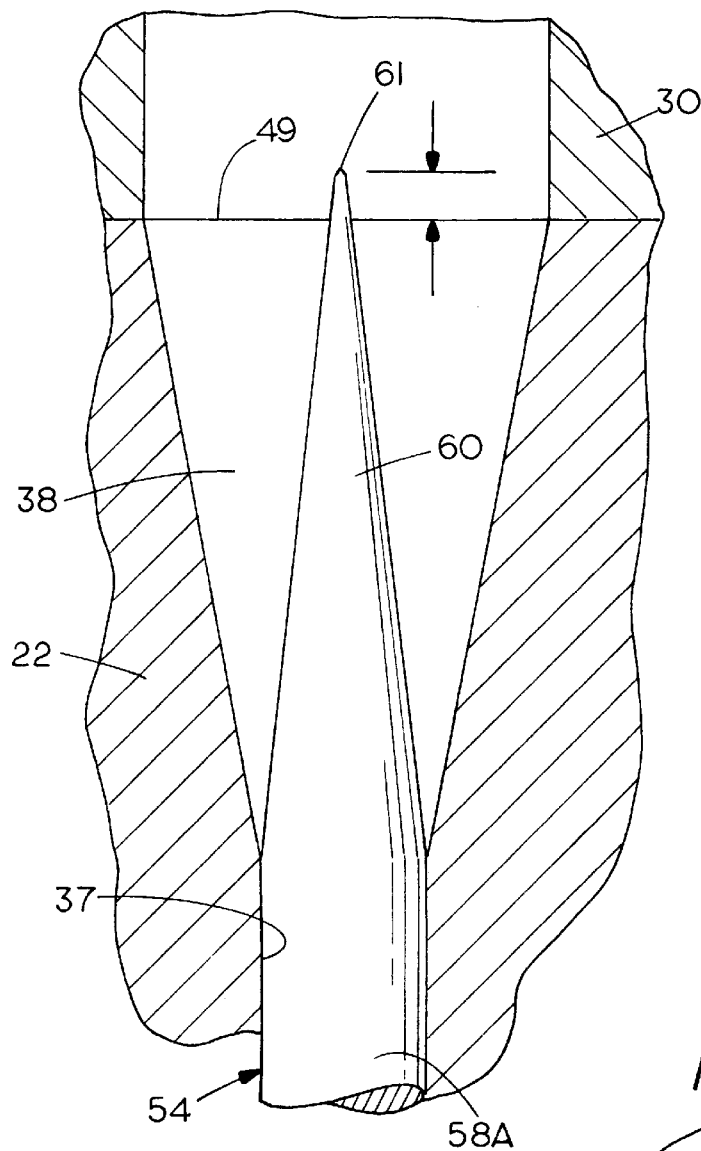
FIG. 4 is a greatly enlarged view of one transition section of a bore forming a waveguide through a flange adapter and illustrating the arrangement of the waveguide relative to a bore transition from a rectangular to a circular opening.
Figure 5:
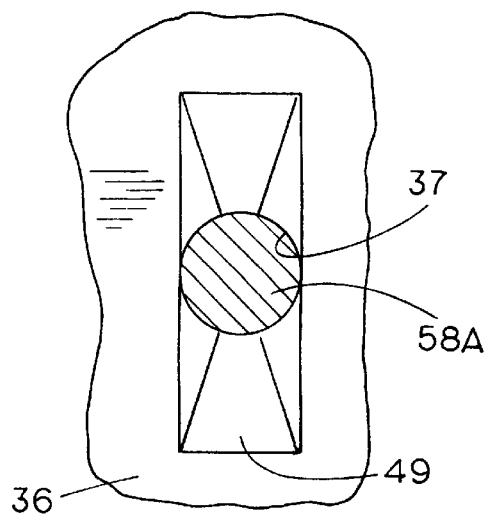
FIG. 5 is a plan view of the flange adapter showing the rectangular opening transitioning to a circular waveguide bore.

A waveguide aperture or bore 37 is formed within the housing to flange adapter 22 and is aligned with waveguide adapter 30. Waveguide bore 37 has a transition section 38 which is in the form of an upwardly expanding, circular to rectangular shaped section. The rectangular opening 49 (indicated in FIGS. 4 and 5) opens to adapter 30. Housing to flange adapter 22 is secured to the mounting flange 24 with bolts of selected size which are torqued to a selected level after assembly on the flanges. Waveguide aperture or bore 37 in the center of adapter 22 aligns with waveguide transition section 38, so that microwave energy transmitted through the waveguide adapter 30 is transmitted through the transition section 38 and the waveguide bore 37.

At the lower end of the housing to flange adapter 22, a spool piece 39 is made to fit into the lower side of the flange 24, and has a neck 40 which extends into an aligning countersunk bore in the housing to flange adapter 22. The neck 40 and the spool piece 39 have a bore 37A which is of the same diameter and aligns with, the bore 37 in the adapter 22. The neck 40 is sealed relative to the counterbore with a suitable O-ring. The spool 39 is welded to the tank flange 24.

The waveguide comprises both bore sections 37 and 37A. The lower end of the waveguide bore section 37A transitions into an expanding cone shaped section 42, which transitions from the circular bore 37A to a larger diameter bore 43 forming an aperture (i.e. waveguide outlet aperture 43) for the transmission of microwave energy to an antenna.

A suitable antenna 48 is mounted on the bottom side of the spool piece 39, and is positioned within the port 16 (see FIG. 1). The antenna 48 is of conventional design and includes a central aperture 50 at an upper end that aligns with waveguide outlet aperture 43 in the spool piece 39, and thus aligns with the waveguide bores 37A and 37 in the adapter 22. The antenna is shown as horn shaped, but can be a stick antenna.

Figure 3:
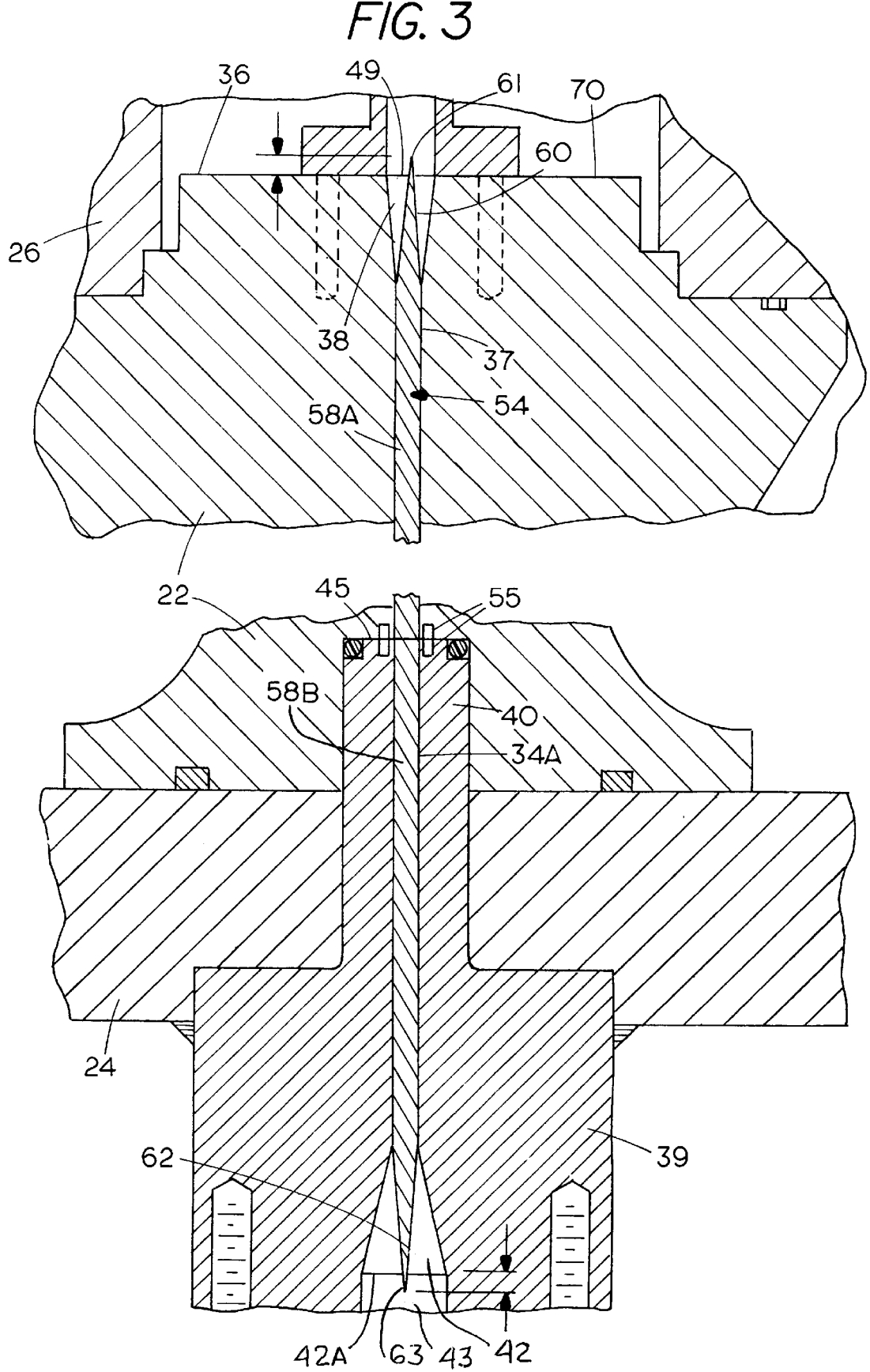
FIG. 3 is an enlarged, fragmentary view of the waveguide portion shown in FIG. 2.

In order to provide a barrier for vapors or liquids that are in the interior of the tank 10, and to prevent the vapors from being discharged to the exterior, a low dielectric mechanical barrier 54 is suitably secured in the waveguide aperture 37 and 37A and forms a mechanical, pressure tight barrier. The low dielectric mechanical barrier 54, as shown in FIG. 2, is an elongated barrier member preferably made in two generally cylindrical center portions 58A and 58B. The section 58A and 58B terminate and are butted together at the end plane of neck 40. The barrier section 58A has a conically tapered or pointed end transition and impedance matching section 60 at an upper end of the barrier. The barrier section 58B has a conically tapered or pointed end transition section 62 (indicated in FIG. 3), at a lower end of the waveguide. The two barrier sections 58A and 58B are press fitted into the respective bores to depths appropriate for impedance match (or epoxied or brazed if appropriate) and joined with braze placed in small pockets 55 bored into the adapter 22 and the neck 40 of spool 39. These braze joints abut each other in the level gage assembly at 45 (FIG. 3). Referring to FIG. 3, the center section 58A of the mechanical barrier member 54 is positioned so that the pointed tip 61 of the barrier transition section 60 is offset from the rectangular opening for the upper transition section at surface 36 an amount determined by experimentation and analysis. The point 61 protrudes above this plane for best impedance matching. The tip 63 of the conical transition section 62 of barrier section 58B is also offset outwardly from the plane 42A at an opening formed by the junction of bore transition section 42 and bore 43.

As stated previously, the bore transition section 38 transitions from the rectangular cross section opening 49 to the circular, smaller cross sectional area bore 37. Transition section 42 transitions from bore 43 to the smaller cross sectional size bore 37A. The upper end, with the bore transition section 38, is shown in greatly enlarged detail in FIGS. 4 and 5.

The fine tuning of the mechanical barrier sections is carried out by forming the barrier section 58A and 58B, after forming the appropriate taper sections 60 and 62, and placing them in the bores 37 and 37A and going through a series of tuning or optimizing steps which are done at the operation frequencies of the waveguide. The end 61 of barrier transition section 60 is adjusted relative to the plane of surface 36 and the end 63 is adjusted (inserted to project more in a series of steps) relative to the opening at plane 42A until transmission is optimized, by experimental means which includes shifting the barrier section and checking a parameter that will vary with a change in impedance matching until the parameter shows that the impedance matching is at its best location. This then provides, quite contrary to common practice, an offset between the barrier ends or points and ends of the bore transition section.

The tests are used to determine the best location of the tapered barrier transition sections (impedance matching) relative to the transition in the waveguide walls. Typical tests include VSWR (reflected microwave energy tests) and in this case level gage performance through analysis of FFT's (fast fourier transforms). The result is to obtain data that is repeatable over a large statistical sample of assemblies and indicates the optimal position of the barriers in the final design release to manufacturing. The level gage will have two optimized transitions, the first is the transition section 38 from a rectangular air filled to a circular barrier filled waveguide. The second is transition 42 from a circular barrier filled bore to a circular air filled bore. Note that the extra insertion required for each transition is slightly different. In one analysis the barrier point offset was 0.090 inches at the first transition and 0.165 inches at the second.

Those skilled in the art can see that there are other possible ways to create this same tuned explosion proof/ flame proof, process sealed waveguide by using materials such as quartz or ceramic, and either press fitting them or joining them to the walls of the waveguide through epoxy or a brazing or soldering operation. These materials and joining methods provide for a waveguide assembly that has reliable process seal and which will withstand higher temperatures and pressures. The brazing or soldering operation is controlled such that the structure or electrical properties of the waveguide wall are not changed significantly, which would thereby disturb the microwave signal.

Once this offset distance has been determined experimentally, the barriers are manufactured so that they will, when positioned with the flat end abutting at the end of neck 40 achieve the correct offset distances for impedance matching at the pointed transition ends 60 and 62.

The unique relationship that is uncovered is to provide for an offset of the ends of the barrier from the ends of the bore transition sections. The normal positioning is to have barrier points in the planes of the ends of the transition sections.

The method of determining the position can be done by measuring any of the parameters that vary with mismatched impedances.

In forming the barriers themselves, once the material type and diameters needed are determined, other parameters need to be met. For example, making the impedance transition sections on the barrier. One of the easiest ways is to make the transition is as shown, using a long pointed conical shape. A conservative estimate for the length of this transition is to make it twice the waveguide wavelength, but this length can be significantly shortened if verified through testing. Typically, the part will need to be shortened to meet mechanical and manufacturing objectives, not to mention the ability of the part to resist breakage. For example, using Teflon, successfully created and tested transition lengths on the order of one waveguide wavelength have been achieved.

The rest of the physical geometry of the barrier are considered to insure it will work within the microwave design constraints and will meet the required pressure and temperature performance objectives, safety approvals, and process seal requirements. Included are such parameters as meeting safety approvals requirements for hydrostatic testing of the assembly and lengths of flamepaths. A specific example of how these parameters are related to each other for one waveguide design is the length/depth of epoxy in an epoxied in place mechanical barrier. First the length of the epoxy joint must be greater than 10 mm to meet approvals requirements. Secondly since the epoxy will likely not adhere to either the Teflon or stainless steel very well, so physical variations in the part are created Lo provide structural support to the joint and create a good process seal. These physical variations or oscillations must be created as smoothly and gradually as possible and within the calculated waveguide diameter limits to minimize the microwave signal losses due to impedance mismatches and reflections.

Although the present invention has been described with reference to preferred embodiments, workers skilled in the art will recognize that changes may be made in form and detail without departing from the spirit and scope of the invention.

What is claimed is:

1. A method of reducing reflected microwave energy in a microwave waveguide for a tank level gage having at least one bore transition portion from a first bore portion of a first area to a second bore portion of a second different area, wherein one of the bore portions contains a mechanical barrier, the mechanical barrier filling the one bore portion and having a tapered barrier transition end portion extending from a main part of the barrier in the one bore to a point, the length of the barrier transition end portion being a selected function of the wavelength of transmitted microwave energy, the method comprising:

providing a housing having the first and second bore portions, forming an elongated mechanical barrier for fitting into the one bore portion, positioning the mechanical barrier in the one bore portion with the point at a location spaced from an end of the bore transition portion, inserting the elongated mechanical barrier to project more in a series of steps to optimize transmission, measuring performance at each step, and placing the mechanical barrier at its best location.

2. The method of claim 1, wherein the one bore portion is the first bore portion and has a circular cross section, the first bore portion expanding to the area of the second bore portion in a taper and transitioning from the circular cross section to mate with the second bore portion having a rectangular cross section for mating with a port in the housing.

3. The method of claim 1, wherein there are barrier transition end portions at both ends of the barrier portion, and including the step of forming the microwave waveguide to have a tapering transition bore portion at an opposite end of the one bore portion from the other bore portion.

4. The method of claim 1 including forming the one bore portion to be of a smaller area than the other bore portion.

5. The method of claim 1 including forming the one bore portion in two aligning bore sections, and mounting a separate barrier in each bore section.

6. A waveguide for use in a process sealed level gage comprising:

a source of microwave energy to be transmitted through the waveguide, said waveguide comprising a bore, said bore having a main portion of a first cross sectional area, and a bore transition portion connecting to said main portion and extending to an opening, said opening being of different cross sectional area than the main bore portion, and a elongated barrier of a low dielectric material filling the main bore portion to provide a process seal, said barrier having a tapered end section projecting into the bore transition portion, said barrier tapered end section tapering to a barrier end adjacent the opening, the barrier end projecting beyond the opening at the end of the bore transition portion, and the elongated barrier of a low dielectric material having a length of insertion adjustable experimentally to optimize transmission.

7. The waveguide of claim 6, wherein the opening is of a generally rectilinear peripheral shape and the main portion of the bore is circular in cross section.

8. The waveguide of claim 6, wherein the rectilinear opening has at least one dimension that is greater than the diameter of the circular main portion of the bore.

9. The waveguide of claim 8, wherein said bore has a second bore transition section at an opposite end of the bore from the opening, said second bore transition section having a second opening spaced from the main portion of the bore and of a different cross sectional size than the main portion of the bore, and said barrier having a second tapered end section tapering to a second end adjacent the second opening, the end of the second tapered end section extending outwardly from the second opening for achieving impedance matching.

10. The waveguide of claim 6, wherein the bore is formed in two housing sections abutting each other and secured together, the barrier comprising two barrier sections, one in each housing section, and having ends abutting when the housings sections abut.

* * * * *